United States Patent [19]
Moser et al.

[11] 4,420,114
[45] Dec. 13, 1983

[54] LIQUID HEATING SYSTEM

[75] Inventors: Gottfried Moser, Gladbach; Walter Nau, Cologne; Ernst D. Neumann, Aachen, all of Fed. Rep. of Germany

[73] Assignee: Klöckner-Humboldt-Deutz AG, Cologne, Fed. Rep. of Germany

[21] Appl. No.: 249,936

[22] Filed: Apr. 1, 1981

[30] Foreign Application Priority Data

Apr. 2, 1980 [DE] Fed. Rep. of Germany ....... 3012760

[51] Int. Cl.³ .................................................. F24C 9/00
[52] U.S. Cl. ..................................... 237/1 R; 122/26; 126/247
[58] Field of Search ............ 122/26; 126/247; 237/12.3 R, 12.3 A, 12.3 B, 1 R

[56] References Cited

U.S. PATENT DOCUMENTS

| | | | |
|---|---|---|---|
| 2,312,996 | 3/1943 | Bethenod | 122/26 |
| 3,333,771 | 8/1967 | Graham | 122/26 |
| 4,060,194 | 11/1977 | Lutz | 122/26 |
| 4,264,826 | 4/1981 | Ullmann | 122/26 |

FOREIGN PATENT DOCUMENTS

| | | | |
|---|---|---|---|
| 2628697 | 1/1977 | Fed. Rep. of Germany . | |
| 2315666 | 1/1977 | France | 122/26 |
| 509238 | 7/1939 | United Kingdom | 126/247 |

Primary Examiner—Albert J. Makay
Assistant Examiner—Henry Bennett
Attorney, Agent, or Firm—Watson, Cole, Grindle & Watson

[57] ABSTRACT

A liquid heating system includes a high-pressure hydraulic pump for suctioning the liquid from the liquid reservoir and delivering it thereto through a liquid conduit into which the pump is coupled. A drive is provided for the pump, and a pressure-reducing element is coupled into the conduit downstream of the pump for reducing the pressure and elevating the temperature of the liquid. The element has a fixed flow passage, and a heat exchanger is coupled into the conduit downstream thereof. An arrangement for controlling the discharge rate of flow produced by the pump is provided as a function of the calorific heat required to be generated by the system and/or of the temperature of the liquid.

21 Claims, 5 Drawing Figures

LIQUID HEATING SYSTEM

RELATED APPLICATIONS

This application relates to U.S. Ser. No. 123,169, filed Feb. 20, 1980, now U.S. Pat. No. 4,352,455, to U.S. Ser. No. 123,944, filed Feb. 25, 1980, now U.S. Pat. No. 4,346,889 and to U.S. Ser. No. 165,083, filed July 1, 1980, now U.S. Pat. No. 4,370,956, all commonly owned herewith.

BACKGROUND OF THE INVENTION

This invention relates to a liquid heating system which includes a high-pressure hydraulic pump, a pressure-reducing element and a heat exchanger.

A known heating system is disclosed in German published application No. 26 28 697 as including a pump, a pressure-limiting means, and a heating exchanger, liquid medium being fed under pressure by the pump through the pressure-limiting means and being converted into heat for the heating of an intended space. The throttling section of the pressure-limiting means is adjustable in order to be able to control the quantity of heat generated. Thus, the level of heat production is controllable by adjusting the throttling of the pressure-limiting means, although no control is provided for adjusting the discharge rate of the flow produced by the pump.

Such a prior art system has several drawbacks in that adjustable pressure conditions at the pressure side of the pump lead to fluctuating heat production and require continuous adjustments, which can only be controlled with a highly sensitive inertia-less pressure-limiting means.

Moreover, the steady operation of the hydraulic pump and the permanent pressurization of the pressure-limiting means and of the heat exchanger are causes of continuous losses of efficiency and of heat. If the input speed of the pump is not controllable, a considerable flow of heating medium will continue to be recirculated when the heat exchanger requires no calorific heat. Even if, with reduced heat production in the pressure-limiting means, the discharge flow is delivered via a bypass line as a function of the pressure, as provided for by an auxiliary device, the frictional and hydraulic losses will persist.

Control is also inadequate for such a prior art system in the event that a high temperature of the heating medium has already been obtained but no additional heat is required in the space to be heated when it is already sufficiently heated. In such cases, the energy fed by the pump as work and contained in the liquid reservoir as heat is lost without being utilized because of the continuous circulation of the medium through the piping system and through the heat exchanger. Even the auxiliary by-pass line control mentioned above provides less than a suitable remedy of such problem.

SUMMARY OF THE INVENTION

It is therefore an object of the present invention to provide a liquid heating system as including a simplified heat-producing element and as having satisfactory control facilities, so as to avoid energy losses for all operating conditions.

Thus, according to the invention, the quantity delivered by the high-pressure supply pump can be controlled as a function of the amount of calorific heat required and/or of the temperature of the heating medium, the flow section of a pressure-reducing element provided for the system being fixed. Thus, in an energy-saving fashion, the supply of energy is controllable rather than the energy conversion element being controllable as before.

If control is effected as a function of the temperature of the heating medium, the amount of liquid delivered and, thereby, the amount of heat produced, is automatically withdrawn to such an extent that only the dissipated heat is replaced. If no heat is withdrawn from the heat exchanger, causing the temperature of the heating medium to rise, the quantity delivered is immediately withdrawn so that no desirable losses can arise. In such case, the nominal temperature value of the heating medium can generally be varied.

If control occurs as a function of the amount of calorific heat required, a temperature value (which can likewise be varied) of the object or the space to be heated appears as the controlled quantity instead of the temperature of the heating medium, while the change of the discharge flow occurs in the same manner as described above when control is effected as a function of the heating medium temperature.

During many operating conditions, e.g. summertime operation when no calorific heat is required, the pump which is subject to dissipation losses can be completely shut off. The present invention provides for automatic stoppage of the pump when there is adequate heat supply from external sources of heat.

The heating system according to the invention may have its own liquid reservoir or may share the liquid reservoir of another work system, such as an internal combustion engine or a hydraulic system. In such case, the heat exchanger can be designed as an oil cooler for these systems if no calorific heat is required, the heat being dissipated to the environment instead of to the space that is to be heated.

The heating system of the invention includes a control device of some suitable type for controlling the quantity of heating medium delivered by the high-pressure supply pump, and a drive provided for the pump may be of the type having a speed which is adjustable as a function of the calorific heat required, such as for example, an internal combustion engine of a vehicle or of working equipment. The output gear ratio of the drive, in carrying out the invention, is increased or the pump is designed in such a manner that even when the drive is at an idling speed the heating system can be fully operational.

Control of the pump discharge flow, which is dependent upon the amount of heat generated, may be effected by varying the pump speed, with the quantity delivered by the pump being held constant for each stroke or revolution, through adjustment of gearing between the drive and the pump or by variation of the discharge flow for each stroke or revolution by an internal adjustment made on the pump.

Irrespective of the type of transmission utilized for the invention between the drive and the pump, only one temperature controller is absolutely necessary. Changes in the quantity delivered by the pump and in the heat production which are caused by speed fluctuations of the drive are regulated by such temperature control, just as are changed conditions in the heat exchanger. However, to minimize the temperature-dependent control processes, the quantity delivered by the pump should be maintained as constant as possible through speed-sensitive control, the delivery temperature and- /or pressure downstream of the pump also being employed as a parameter for the speed and as an adjusting force for the drive. If speed-sensitive control is provided, this should be effected by the same transmission element as the temperature-sensitive controller. However, two independent control devices are also possible and may be chosen from the embodiments of the system described herein, or may be of different equivalent forms. Regardless of the type of control device, in the final analysis, the discharge volume is according to the invention, controlled as a function of the temperature of the heating medium which may be measured downstream of the heat exchanger, or as a function of the temperature of the heat-reducing means to be measured in spaces or on objects to be heated, and additional adjusting provisions may be made for the desired temperature level.

Other objects, advantages and novel features of the invention will become more apparent from the following detailed description of the invention when taken in conjunction with the accompanying drawings.

DETAILED DESCRIPTION OF THE INVENTION

Figure 1:
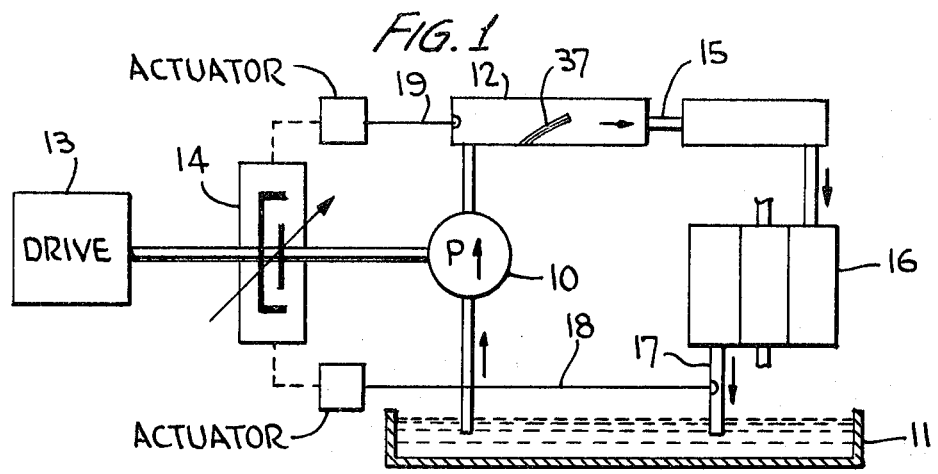
FIG. 1 schematically illustrates the heating system according to the invention as having an adjustable gear transmission for the high-pressure supply pump.

An embodiment of a liquid heating system according to the invention is illustrated in FIG. 1 as including a high-pressure hydraulic pump 10 which suctions liquid from a liquid reservoir 11 and delivers it thereto through a liquid conduit 12 into which the pump is coupled. A suitable drive mechanism 13 is provided for driving the pump via an adjustable gear transmission 14. The high-pressure supply pump 10 suctions the liquid heating medium and delivers it under pressure through a pressure-reducing element 15 for reducing the pressure and elevating the temperature of the liquid passing therethrough. The liquid heating medium exiting element 15 is thus heated and flows substantially without pressure through a heat exchanger 16, disposed in a space to be heated, and from there via a return line 17 back to the liquid reservoir. The gear transmission ratio of assembly 14 is arranged to be adjusted as a function of the temperature of the heating medium downstream of heat exchanger 16, such temperature being transmitted to assembly 14 via a control line 18 which includes a solenoid for effecting the gear ratio adjustments as a function of the sensed temperature of the heating medium downstream of the heat exchanger. Thus, control of the discharge rate of the flow of the pump is provided as a function of the amount of calorific heat required, so that the temperature value of the object or the space to be heated appears as the controlled quantity. If no heat is withdrawn from the heat exchanger, causing the temperature of the heating medium to rise, the quantity delivered by the pump is immediately withdrawn, by adjustment of gear transmission assembly 14 which controls the pump output, so that no desirable losses can arise.

Alternatively, or in addition, the discharge rate of flow of the pump can be controlled as a function of the temperature of the liquid measured at the pressure side of the pump. This liquid temperature is transmitted via a control line 19 to the transmission which is adjusted in accordance with the liquid temperature by the provision of a solenoid in line 19. With the control of the pump discharge thus effected as a function of the temperature of the heating medium, the amount of liquid delivered and, thereby, the amount of heat produced, is automatically withdrawn to such an extent that only the dissipated heat is replaced. As before, if no heat is withdrawn from the heat exchanger, causing the temperature of the heating medium to rise, the quantity delivered is immediately withdrawn so that no undesirable losses can arise. In such cases, the nominal temperature value of the heating medium can generally be varied.

Pressure-reducing element 15, which is exposed to a considerable loading strain at the throttling point when subjected to high pressure produced by the pump, is nevertheless formed as a simple and inexpensive element of some suitable standard variety. Since the discharge rate of flow of the pump is controlled in the manner as aforedescribed, the pressure-reducing element is formed as a fixed restrictor.

Figure 2:
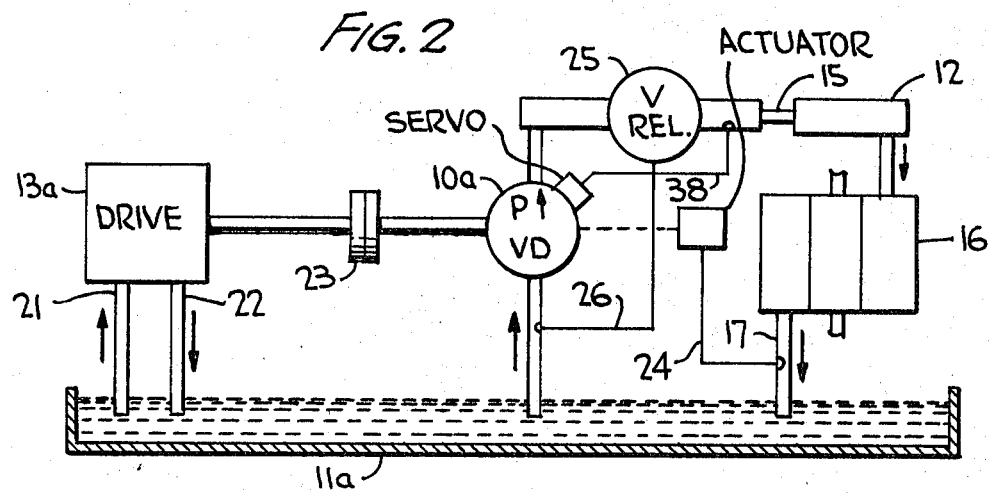
FIG. 2 schematically illustrates another embodiment of the heating system according to the invention as having an adjustable high-pressure supply pump.

As shown in FIG. 2, the heating system according to the invention may be coupled with a drive mechanism 13a which comprises an internal combustion engine of a vehicle or some other work machine using an oil lubricating system. The liquid medium of the present heating system therefore comprises an oil lubricant, and reservoir 11a of engine 13a is shared with the heating system illustrated in FIG. 2. Heat exchanger 16 of this system may therefore alternatively be formed as an oil cooler if no calorific heat is required, the heat being dissipated to the environment instead of to the space to be heated.

Engine 13a has suction and return oil lubricant lines 21 and 22 as part of its lubricating system, oil reservoir 11a thus serving as its oil pump. In this embodiment, the supply pump of the heating system comprises a high-pressure variable delivery pump 10a which is driven at a constant speed by engine 13a through a speed-related mechanical coupling 23 which may be formed as a clutch. The discharge rate of the flow by the pump is adjusted as a function of the amount of calorific heat required. Thus, a control line 24 which includes a solenoid, is provided for transmitting temperature data from return line 17 downstream of the heat exchanger, to variable delivery pump 10a to effect the adjustment thereof. In addition, a speed-sensitive adjustment means may be provided for adjusting the discharge rate of the flow relative to the speed of the engine. Or, a control line such as 19, described with reference to FIG. 1, may be provided for the transmission of the temperature data to the pump from the pressure side thereof so that adjustment of the discharge rate of flow becomes a function of the heating medium temperature.

Since high-pressure supply pump 10a is designed to produce its rated power at an early stage within the speed range of drive mechanism 13a, a pressure-reducing means in the form of an overpressure release valve 25 is provided in conduit 12 upstream of pressure-reducing element 15 for venting pressure when the quantity delivered by the pump rises above a maximum level set in valve 25. The overpressure from valve 25 returns via a bypass line 26 to the suction side of the pump. Thus, the displacement of the high-pressure supply pump is indirectly limited to a maximum value as a function of its speed.

Instead of an overpressure release valve, a pressure cylinder (not shown) may be employed which causes drive mechanism 13a to be adjusted or the high-pressure supply pump to be set in a manner so as to reduce the discharge rate of flow by the pump.

However, the discharge flow valve used can otherwise be limited by multiplying the pump drive which diminishes with increasing input speed, or by the provision of an adjustable belt drive, an induction coupling, etc. which may also be considered as a possible transmission means between the drive mechanism and the pump.

Figure 1A:
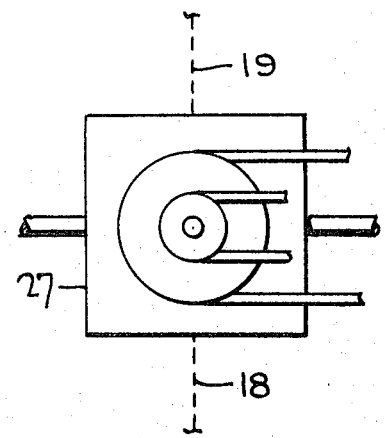
FIGS. 1A and 1B are schematic illustrations of a split belt pulley transmission and an electromagnetic induction coupling, respectively, between the drive and the pump in lien of the gear transmission of FIG. 1.

FIG. 1A discloses such an adjustable belt drive, generally designated 27, as located between drive mechanism 13 and pump 10 as an alternative to the provision of gear transmission assembly 14. Thus, the distances of bearing faces of a split-belt pulley can be varied in such a manner that the translation ratio diminishes with increasing speed of the drive mechanism. For effecting the adjustment of belt drive assembly 27, control lines 18 and 19 may each include a temperature-sensitive expanding element.

Figure 1B:
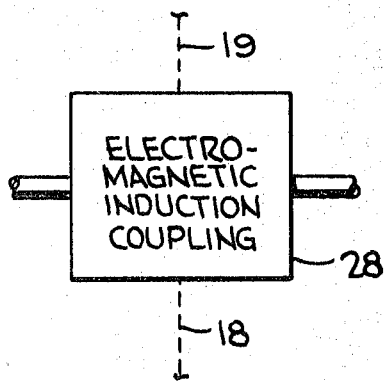

Another possible transmission means between drive mechanism 13 and pump 10 includes an electromagnetic induction coupling, generally designated 28 in FIG. 1B. Thus, adjustment of the discharge rate of flow produced by the pump can be effected by the variable excitation current of coupling 28, which is controllable via control line 18 as a function of the amount of calorific heat required, and/or which is controllable via control line 19 as a function of the temperature of the heating medium at the pressure side of the pump. The control can be effected by an adjustable resistance which, in turn, can be adjusted by centrifugal forces and/or by thermal expansion forces. However, in a simplified construction, these forces can, with the excitation current being held constant, immediately cause the air-gap width of the electromagnetic induction coupling to be varied.

Figure 3:
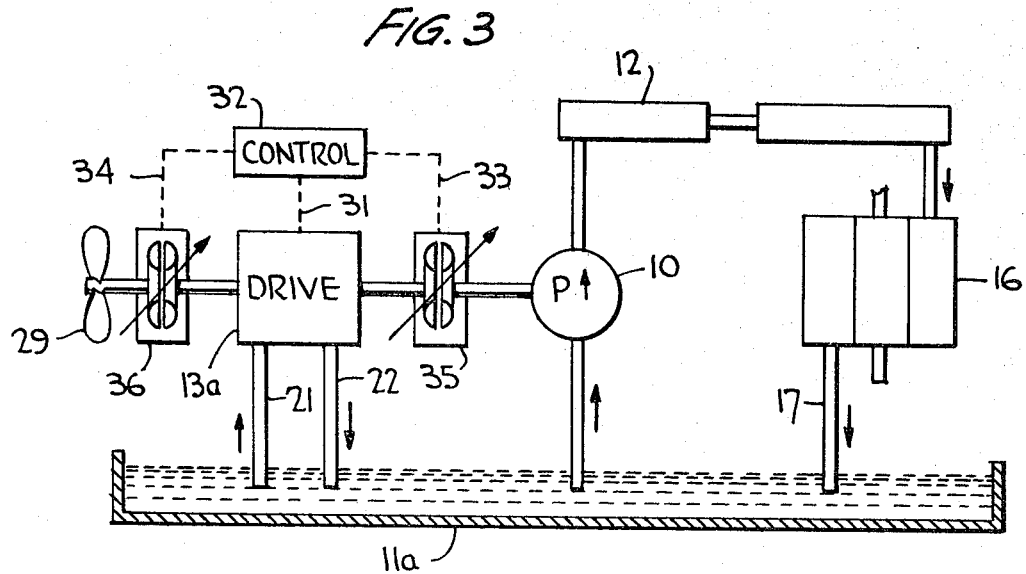
FIG. 3 schematically illustrates still another embodiment of a heating system according to the invention as having a coupling which is adjustable as a function of a fan drive.

The heating system shown in FIG. 3 is similar to that of FIG. 2 except that high-pressure hydraulic pump 10 is not of the variable delivery variety.

Temperature control means for internal combustion engines are known as comprising a cooling fan for water-cooled engines and a cooling air blower for air-cooled engines. In the FIG. 3 embodiment, the drive control of the high-pressure hydraulic pump is combined with the existing temperature control means of the engine, because of the contra-effect of the speed demand upon the control means and the drive control that is to be utilized. A stationary fan drive 29 signals an inadequate engine temperature which, aside from the starting process, establishes itself when the temperature of the environment is low, so that a need for calorific heat may again be assumed. This calls for the operation of pump 10 in the heating circuit. Even if there is no need for calorific heat, heating of the lubricating oil to achieve sound operating conditions of the internal combustion engine, is advisable. If, on the other hand, fan 29 runs at maximum speed and there is a need for calorific heat, the heat being accumulated in the lubricating oil can be dissipated to the space being heated instead of the environment. Additional supply of energy by means of the high-pressure supply pump is therefore inappropriate in such instances. Thus, the pump can be stopped.

The system according to the invention automatically performs the alternation between the drives described above. To transmit a component temperature employed as a controlled variable from the directly or indirectly blower-cooled mechanism 13a there is provided a control line 31 which transmits, with reciprocal action through a control element 32, the engine temperature signals via control lines 33 and 34 respectively to the control elements of couplings 35, 36, which are illustrated as hydrodynamic couplings. Thus, an interaction between the intakes of the two hydrodynamic couplings is established, the maximum heating effect being insured when the fan is running at minimum speed, while only an adequate circulation of an already heated quantity of oil is maintained when the fan is running at full speed.

Thus, a hydrodynamic coupling 36 is provided for adjusting the drive of the cooling blower 29 and hydrodynamic coupling 35 is provided for adjusting the drive of the high-pressure supply pump, both couplings being of the so-called filling regulated liquid coupling type, the liquid level of coupling 35 being controlled as a function of the input speed to the pump and/or the temperature of the heating medium or as a function of the amount of calorific heat required. The inlet of coupling 35 is provided with a control valve (not shown), the cross section of which is infinitely variable as a function of the temperature. Otherwise, the inlet of coupling 35 may be provided with a shutoff valve which is closeable in stages as a function of the temperature. A temperature-regulated control valve (not shown) in the supply pipe for coupling 36 of cooling blower 29 discharges a minimum flow at a high temperature of the engine, and at a low temperature of the engine discharges an increasing partial flow into the supply pipe for coupling 35 of the high-pressure supply pump. And, since the drive of the pump is connected to control elements 32 of the cooling blower drive in opposite operative connection, the stoppage of the minimum speed of cooling blower 29 is adjustable together with the maximun delivery of the high-pressure supply pump, and the maximum speed of cooling blower 29 is adjustable together with the minimum delivery of the pump.

Returning to the FIG. 1 embodiment, the rate of pump discharge can be controlled by the provision of an expandable flow control element 37 located in conduit 12 and being sensitive to the temperature of the liquid. Or, control lines 18 and/or 19 may include a thermostatic switch extending into the conduit for switching the pump on and off depending on a predetermined temperature of the liquid. And, the rate of discharge of pump 10a may be controlled by a servo-element (FIG. 2) pressured upstream of pressure-reducing element 15 via control line 38.

And, further with respect to the FIG. 2 embodiment, variable delivery pump 10a may include a setting device for the speed-related displacement control as a function of the temperature of the liquid. A servo-element disposed upstream of pressure-reducing elements 15 is provided for actuating such setting device. Alternatively, a hand-operating control element (not shown) may be provided for setting the displacement, more particularly, for stopping the drive of the high-pressure supply.

Obviously, many other modifications and variations of the present invention are made possible in the light of the above teachings. It is therefore to be understood that within the scope of the appended claims the invention may be practiced otherwise than as specifically described.

What is claimed is:

1. A liquid heating system, comprising a high-pressure hydraulic pump for suctioning the liquid from a liquid reservoir and delivering it thereto through a liquid conduit into which said pump is coupled, a variable speed internal combustion engine of a motor vehicle or an operating apparatus provided for driving said pump, a pressure-reducing element comprising a non-adjustable restrictor coupled into said conduit downstream of said pump for reducing the pressure and elevating the temperature of the liquid, said element having a fixed flow passage, a heat exchanger coupled into said conduit downstream of said element, and means for controlling the discharge rate of flow of said pump as a function of the calorific heat required to be generated by the system and/or of the temperature of the liquid, said control means including means for adjusting said pump for maintaining a predetermined discharge rate of flow thereof upstream of said pressure-reducing element even at low idling speeds of said engine, said adjusting means comprising a transmission assembly between said engine and said pump, said transmission assembly being inversely coupled to said engine so as to effect a decreasing transmission ratio as engine speed increases.

2. The system according to claim 1, wherein said heat exchanger is disposed within a space to be heated and thereby comprises a heater.

3. The system according to claim 1, wherein said heat exchanger is exposed outside the system and thereby comprises a liquid cooler.

4. The system according to claim 1, wherein said pump comprises a variable delivery pump as said adjusting means.

5. The system according to claim 4, wherein a pressure release valve is coupled into said conduit upstream of said pressure-reducing element, and a by-pass conduit extends between said pressure release valve and the intake side of said pump, said valve being set for releasing any pressure above said predetermined discharge rate of flow of said pump.

6. The system according to claim 1, wherein said transmission assembly comprises a split pulley belt drive means between said engine and said pump, said belt drive means having at least one effective pulley diameter controllable as a function of the temperature.

7. The system according to claim 1, wherein said transmission assembly comprises an electromagnetic induction coupling between said engine and said pump, the excitation current of said coupling being controllable as a function of the temperature.

8. The system according to claim 1, wherein said transmission assembly comprises an electromagnetic induction coupling between said engine and said pump, the air gap width of said coupling being controllable as a function of the temperature.

9. The system according to claim 1, wherein said liquid comprises lubricating oil contained within said reservoir which functions as an engine oil sump, suction and return oil conduits between said engine and said sump, said transmission assembly comprises a filling-regulated hydrodynamic coupling between said engine and said pump, the liquid level of said coupling being controlled as a function of the operating speed and temperature of said engine for holding constant the quantity of oil delivered by the pump irrespective of changes in the operating speed and temperature of said engine.

10. The system according to claim 9, wherein said coupling has an inlet provided with a control valve having a cross-section which is variable as a function of the engine temperature.

11. The system according to claim 9, wherein said inlet is provided with a shutoff valve which is closeable in stages as a function of the engine temperature.

12. The system according to claim 1, wherein said engine comprises an air-cooled engine, said adjusting means comprising a cooling-blower operatively connected to said engine and being controllable as a function of the engine temperature, said adjusting means further comprising a control mechanism for sensing the operating temperature of said engine, said pump being inversely connected through said control mechanism to said blower drive for increasing the output of said pump as blower speed decreases, and vice versa.

13. The system according to claim 12, wherein said adjusting means still further comprises first and second hydrodynamic couplings respectively located between said engine and said cooling-blower and between said engine and said pump, first and second oil conduits interconnecting said control mechanism respectively with said first and second couplings, said first conduit having a supply pipe containing a temperature-regulated control valve for discharging a minimum flow at a high engine temperature, and discharging an increasing partial flow into said second conduit at low engine temperatures.

14. The system according to claim 1, wherein said control means includes an expandable flow control element in said conduit and being sensitive to the temperature of the liquid for controlling the rate of pump discharge.

15. The system according to claim 1, wherein said control means includes a flow control element comprising a thermostatic switch in said conduit for switching said pump on and off depending on a predetermined temperature of the liquid.

16. The system according to claim 1, wherein said control means includes a servo-element pressurized upstream of said pressure-reducing element.

17. The system according to claim 1, wherein said control means includes an overpressure release valve in said liquid conduit upstream of said pressure-reducing element.

18. The system according to claim 1, wherein said control means includes an adjustable discharge element in said pump for controlling the discharge rate of said pump.

19. The system according to claim 18, wherein said control means further includes a servo-element pressurized upstream of said pressure-reducing element for actuating said discharge element.

20. The system according to claim 1, wherein said control means includes a manually operable adjustable discharge element in said pump for controlling the discharge rate of flow thereof.

21. The system according to claim 1, wherein said control means includes a control line connected to said liquid conduit downstream of said heat exchanger for sensing the temperature of the liquid.

* * * * *